United States Patent [19]

Miller et al.

[11] Patent Number: 5,525,664
[45] Date of Patent: Jun. 11, 1996

[54] PROCESS AND COMPOSITION FOR THE MANUFACTURE OF WET STRENGTHENED PAPER

[75] Inventors: Andrew J. Miller, Orpington; Brian M. Stubbs, Sidcup, both of England

[73] Assignee: Hercules Incorporated, Wilmington, Del.

[21] Appl. No.: 349,113

[22] Filed: Dec. 2, 1994

[30] Foreign Application Priority Data

Dec. 31, 1993 [NL] Netherlands ............... 9302294

[51] Int. Cl.$^6$ ............... C08K 3/18; D21H 21/20
[52] U.S. Cl. ............... 524/845; 162/164.6; 525/408
[58] Field of Search ............... 524/845, 878, 524/879; 162/164.6; 525/408

[56] References Cited

U.S. PATENT DOCUMENTS

| | | | |
|---|---|---|---|
| 2,926,154 | 2/1960 | Keim | 260/29.2 |
| 3,049,469 | 8/1962 | Davison | 162/164 |
| 3,311,594 | 3/1967 | Earle | 260/77.5 |
| 3,891,589 | 6/1975 | Ray-Chaudhuri | 260/29.2 |
| 3,932,363 | 1/1976 | Lehmann et al. | 260/78 |
| 4,166,002 | 8/1979 | Lehmann et al. | 162/164 |
| 4,195,138 | 3/1980 | Ward | 525/408 |
| 5,122,577 | 6/1992 | Noda | 525/426 |
| 5,169,441 | 12/1992 | Lauzon | 106/416 |
| 5,200,036 | 4/1993 | Noda | 162/164.3 |
| 5,314,721 | 5/1994 | Müller et al. | 427/386 |
| 5,316,623 | 5/1994 | Espy | 162/164.3 |
| 5,342,875 | 8/1994 | Noda | 524/457 |

FOREIGN PATENT DOCUMENTS 865727 4/1961 United Kingdom .

*Primary Examiner*—Veronica P. Hoke
*Attorney, Agent, or Firm*—Ivan G. Szanto; Joanne W. Patterson

[57] ABSTRACT

A process for making wet strengthened paper comprises (1) treating an aqueous suspension of papermaking fibers with a composition comprising (a) a cationic polymer that cures at a neutral pH and is capable by itself of conferring wet strength to paper, the resin having a multiplicity of 3-hydroxyazetidinium ion groups along the polymer chain, and (b) a water-soluble carboxyalkylated polyamine polymer or a carboxylic acid salt thereof.

54 Claims, No Drawings

PROCESS AND COMPOSITION FOR THE MANUFACTURE OF WET STRENGTHENED PAPER

This invention relates to a wet strength composition containing a cationic resin curing at a neutral pH and having a multiplicity of 3-hydroxyazetidinium ion groups, and use of the composition for the manufacture of paper having permanent wet strength.

BACKGROUND OF THE INVENTION

Paper that has not been treated to increase its strength disintegrates readily on immersion in water, largely because the hydrogen bonds acting between paper fibers in the dry state are destroyed. It is well known that treatment by certain polymers can confer wet strength properties to paper. The wet strengthening effect can be only temporary, i.e., the disintegration of paper may be delayed on immersion in water, or the strengthening effect can be permanent. If the wet strengthening effect is permanent, the paper retains perhaps 15% or more of its tensile strength on lengthy immersion in water compared to its tensile strength in the dry or near dry state.

The wet strengthening of paper is to be distinguished from such known processes as the sizing or waterproofing of paper that reduce the rate of, or eliminate, respectively, the absorption of water by paper fibers. Many of the industrial and domestic uses of wet strengthened paper require high levels of paper wet strength together with rapid rates of water absorption, e.g., in paper tissue and toweling.

Known polymers capable of producing permanent wet strength in paper include formaldehyde-based resins such as urea- and melamine-formaldehyde resins, and the 3-hydroxyazetidinium ion-containing resins. The latter, collectively referred to in this specification as Type I polymers, are particularly useful for making permanently wet strengthened paper for several reasons: they confer relatively high levels of wet strength based on a given dry mass ratio of resin to paper fiber, they do not impart an undesirable rough feel to the resulting paper, and they confer paper wet strength that is relatively permanent on treatment with aqueous solutions of low pH.

These Type I polymers can be classified into two main classes, A and B, depending on the nature of the precursors from which they are made. Class A polymer precursors are polyalkylene polyamines. Class B polymer precursors are a further class of polyamines, the polyamidoamines. Both Class A and Class B polymer precursors are reacted with an epihalohydrin to produce the Type I polymers.

While Type I polymers are effective by themselves for imparting wet strength to paper, they possess certain shortcomings in relation to performance and utility. In particular, the wet strength as measured by the paper wet tensile strength is inadequate for some purposes. Previous attempts to address this and other shortcomings have met with some success. In particular, the joint use of Type I polymers with sodium carboxymethylcellulose, as described in U.S. Pat. No. 5,316,623, is known to promote the wet and dry strength of paper compared to the use of a Type I wet strength resin alone.

In practice, however, the use of sodium carboxymethylcellulose has met with resistance from commercial papermakers because of its high viscosity in aqueous solution, e.g., aqueous solutions of 2% by weight have viscosities in excess of 1000 mPa.s (milliPascal.seconds) Dilute solutions having a viscosity of 1000 mPa.s and above are expensive to transport, based on the active ingredient content of the solution, and difficult to pump. An obvious alternative, the transport of solid grades or dispersed grades, requires the end user to dissolve and make solutions of the required concentration of sodium carboxymethylcellulose, which is time, energy and labor intensive. Moreover, the increased viscosity imparted by such a polymer results in a slower rate of drainage of the fiber slurry during papermaking and a slower rate of paper manufacture.

Another factor that adversely affects the use of sodium carboxymethylcellulose to promote the performance of Type I resins, is the quite different chemical plant and chemical starting materials required to manufacture the two types of polymers.

A further factor that adversely affects the use of sodium carboxymethylcellulose to promote the performance of Type I wet strength resins is that quite dilute aqueous blends of the two polymers have been found to increase in viscosity, probably through polymer network formation and/or polyelectrolyte complex formation. This practically precludes the formulation of a single solution blend of a Type I polymer and sodium carboxymethylcellulose.

There is therefore a need for a polymer that can provide the following advantages:

Enhancing the wet strength properties of Type I polymers by providing a polymer that possesses a viscosity of less than about 1000 mPa.s at a polymer solids concentration of at least about 10% at a temperature of 25° C.

Enhancing wet strength properties with the potential capability of sharing common starting materials, intermediates, manufacturing plant, and process steps.

The capability, in a polymer that has carboxyl groups, of forming more stable aqueous solution blends with a Type I polymer than does sodium carboxymethylcellulose.

SUMMARY OF THE INVENTION

The composition of this invention for making wet strengthened paper comprises (1) a cationic polymer that cures at a neutral pH and is capable by itself of conferring wet strength to paper, the resin having a multiplicity of 3-hydroxyazetidinium ion groups along the polymer chain, and (2) a water-soluble polyamine polymer comprising tertiary amine groups substituted with a carboxyalkyl group, or a carboxylic acid salt thereof, within recurring units along the polymer chain.

Preferably the tertiary amine groups have the following formula:

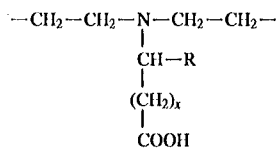

or a carboxylic acid salt thereof, where R is selected from the group consisting of H, methyl, and ethyl, and x is 0 or the integer 1.

Also according to the invention, wet strengthened paper is made by (1) treating an aqueous suspension of papermaking fibers with the composition described above, (2) forming a wet layer of the resulting slurry, and (3) drying the resulting layer at an elevated temperature to give a wet strengthened paper.

In this specification, polymer (1) is designated as a Type I polymer, and polymer (2) is designated as a Type II polymer.

Among the advantages of the process according to the invention, compared to prior processes, are (1) higher levels of wet strength for a given addition level of Type I polymer when used in conjunction with a Type II polymer, (2) use of a common polymeric starting material to make Type I and Type II polymers, and (3) the availability of carboxyl group-containing polymer solutions of a given concentration that have a lower viscosity in aqueous solution than carboxyl group-containing polymers such as sodium carboxymethylcellulose.

DETAILED DESCRIPTION OF THE INVENTION

Polymer (1) of the composition of this invention that is used to impart permanent wet strength to paper is designated as a Type I polymer and can be classified into two main classes, A and B, depending on the nature of the precursor from which it is made. Class A polymer precursors are polyalkylene polyamines of the following general formula:

$$H_2N((CH_2)_mNH)_n(CH_2)_mNH_2 \qquad (I)$$

where n is an integer from 1 to 6 and m is an integer from 2 to 8. Preferred examples of this type of amine are diethylenetriamine, where n is 1 and m is 2, and dihexamethylenetriamine where n is 1 and m is 6.

Class B polymer precursors are a further class of polyamines, the polyamidoamines, which can be prepared by known methods such as those described in UK Patent 865,727; European Patent 469,891, and U.S. Pat. Nos. 2,926,154; 3,891,589, and 5,171,795, the disclosures of which are incorporated by reference in their entirety. Examples of commercial products made by processes disclosed in these patents are available from Hercules Incorporated, Wilmington, Del., U.S.A., as KYMENE® 557 wet strength resin, KYMENE® SLX wet strength resin, and Polymer 567.

One particularly useful route to such polyamidoamines is the polycondensation of a polyalkylene polyamine having the formula (I) with an aliphatic dicarboxylic acid having the general formula:

$$HOOC(CH_2)_yCOOH \qquad (II)$$

where y is an integer from 3 to 5. Particularly preferred Class B polymer precursors are those obtained by reacting diethylenetriamine and adipic acid (y=4).

The patents cited above describe polyamidoamine synthesis in greater detail. Typically, approximately equimolar quantities of polyalkylene polyamine and dicarboxylic acid are mixed, and salt formation occurs with the evolution of heat. The reaction mixture is then stirred and heated to a temperature of 150° to 210° C. The course of the polycondensation can be followed by collecting and measuring the amount of water evolved and the rate at which the water is evolved from the reaction mixture. The polyamidoamine product obtained has recurring polymer units of the following general formula:

$$-\{NH((CH_2)_mNH)_n(CH_2)_mNHCO(CH_2)_yCO\}- \qquad (III)$$

Half-reacted polyalkylene polyamine or dicarboxylic acid groups form the end groups of the predominantly linear polymer that is produced. The average molecular weight of the polymer is influenced by the mole ratio of the dicarboxylic acid to the polyalkylene polyamine, the reaction temperature and duration, and the completeness with which water is removed from the reaction mixture.

The Class A and B polymer precursors do not have significant wet strengthening properties. Such properties are conferred by reaction in an aqueous medium of the secondary amine groups of the Class A and Class B polymer precursors with an epihalohydrin to give 3-hydroxyazetidinium ion-bearing polymers in accordance with the following reaction sequence:

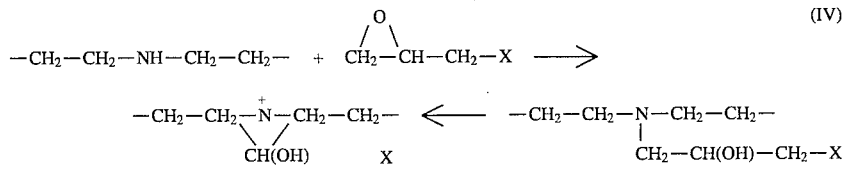

(IV)

where X is halogen. Epichlorohydrin, where X is Cl, is the preferred epihalohydrin.

Other reactions of epihalohydrin with the Class A and B polymer precursors also take place in parallel with the formation of 3-hydroxyazetidinium ions. These reactions have a bearing on the properties of the polymer product. They include reaction of terminal primary amine groups in the case of the polyalkylene polyamines, and both terminal primary amine and terminal carboxylic acid groups in the case of the polyamidoamines. These reactions can lead to extended polymer chains.

Crosslinking can also occur through the reaction of some 3-hydroxyazetidinium ion and glycidylamine groups with, for example, basic and nucleophilic groups on neighboring polymer chains. Such reactions cause an increase in the polymer molecular weight, which can be monitored by measuring the concomitant viscosity increase of the reaction mixture. If permitted to proceed too far, however, the polymer may became a useless gel through network formation. This is prevented by terminating the reaction at a predetermined viscosity through the addition of, for example, mineral acid, such as sulfuric, phosphoric, or nitric acid. The acid causes protonation of nucleophilic and basic sites on the polymer chains. Dilution of the resin with water also assists in stabilizing the resulting resin solution.

For prolonged storage, sufficient acid and water are added to reach a pH and concentration consistent with a stable or slowly decreasing polymer viscosity.

Synthesis of 3-hydroxyazetidinium ion-bearing polymers is described in more detail in UK Patent 865,727; U.S. Pat. No. 2,926,154; U.S. Pat. NO. 3,891,589 and U.S. Pat. No. 3,311,594, the disclosures of which are incorporated by reference in their entirety.

It will be apparent to those skilled in the art that the ratio of terminal primary amine groups to recurring polymer units will be greater for a Class A polymer precursor, a polyalkylene polyamine, than for a Class B polymer precursor, a polyamidoamine. A lesser proportion of the epihalohydrin will therefore be involved in reactions with terminal primary amine groups in the case of the Class B polymer precursors, the polyamidoamines. For this reason Class B polymer precursors are preferred for making Type I polymers.

The compositions of this invention for imparting wet strength to paper comprise a mixture of a Type I polymer as described above and a water soluble carboxyalkylated polyamine polymer comprising tertiary amine groups substituted with a carboxyalkyl group, or a carboxylic acid salt thereof, that is designated as a Type II polymer. Preferably the tertiary amine groups within recurring units along the polymer chain have the formula:

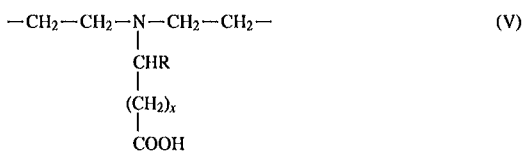

(V)

where R is selected from the group consisting of H, methyl, and ethyl, and x is 0 or the integer 1, or a carboxylic acid salt thereof.

In aqueous solution, polymers possessing the Type II polymer linkage will ionize to give a carboxylic acid anion. Such polymers can also be partly or fully neutralized to give an aqueous solution of a metal cation or ammonium salt. Metal cations with multiple charges, such as $Al^{3+}$ or $Fe^{3+}$, can also be employed for the neutralization, and these can confer crosslinks within an aqueous solution of the polymer, which can be useful in some cases.

Type II polymers are prepared by reacting a polyamine polymer, preferably a polyalkylene polyamine or polyamidoamine polymer, with a compound that introduces a carboxylic acid group at the secondary amine group of the polyamine. The same precursors that are used to prepare Type I polymers can be used in the synthesis of Type II polymers. Polyalkene polyamines having the formula (I) that have n between 3 and 6 inclusive, and all of the polyamidoamines described above can be used. The polyamidoamines are the preferred materials. The synthesis of type II polymers is described, for example, in U.S. Pat. Nos. 4,166,002 and 3,932,363, the disclosures of which are incorporated by reference in their entirety.

The most preferred intermediates for the preparation of Type II polymers are polyamidoamines that have been modified by chain extension and light crosslinking. This is accomplished by treating the polyamidoamine with a less than stoichiometric amount of an epihalohydrin, based on the content of secondary amine groups present in the polyamidoamine. A typical range is between about 0.02:1 and about 0.25:1. The reaction can be carried out in aqueous solution with heating, and the course of the reaction can be followed by measuring and monitoring the reaction mixture viscosity increase. A particularly desirable outcome is reaching an optimum and stable viscosity, after which little or no further increase is obtained on further heating.

To introduce the carboxyl group into the polyamine, two alternative synthetic methods are useful. The preferred method involves the alkylation of the secondary amine groups of the polyamine with an α- or β-haloaliphatic carboxylic acid having the formula

(VI)

in which R is H, methyl or ethyl; X is Cl, Br, or I, and x is 0 or the integer 1. The reaction is carried out in aqueous solution and is exemplified by the following alkylation reaction with sodium chloroacetate:

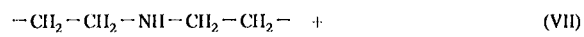

(VII)

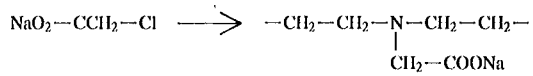

The second method involves the reaction of an ethylenically unsaturated carboxylic acid, such as acrylic acid, with polyamine secondary amine groups as set out below:

(VIII)

$$HOOC-CH=CH_2 \longrightarrow -CH_2-CH_2-N-CH_2-CH_2- \\ | \\ CH_2-CH_2-COOH$$

For the synthesis of Type II polymers it is important that the carboxylic acid reactant should substantially react before the termination of the reaction. The concentrations of residual starting materials can be determined in the course of the reaction and in the final product using analytical methods such as gas-liquid chromatography.

After the reaction, the Type II polymer product can be diluted with water to adjust the product to the desired concentration or viscosity. Preferred products have viscosities of 1000 mPa.s or less at a polymer solids concentration of at least about 10%, preferably at least about 20%, and most preferably at least about 30% by weight at a temperature of 25° C.

The process of this invention for making wet strengthened paper comprises contacting an aqueous dispersion of papermaking fibers with a mixture of Type I and II polymers in aqueous solution. This can be done by preblending solutions of the two types of polymers and then adding the blend to a fiber slurry. Alternatively the fibers can be treated with one of the polymers in solution followed by the addition of the other polymer prior to papermaking.

Wet end pH ranges before papermaking, in accordance with the invention, are between 4 and 10, preferably between 5 and 9. Addition levels of the mixture of polymers can be between about 0.1 and 4% on a dry basis combined, based on the mass of dry paper fibers. Dry mass ratios of Type I:Type II polymers can be between about 1:0.1 and about 1:2.

The slurry of treated fibers is then formed into a wet layer and the water is removed from the layer by known methods, preferably suction in combination with heating, to give a wet strengthened paper. Heating accelerates the development of wet strength within the paper. Some further increase in paper wet strength can normally be expected during the storage of paper after drying, particularly at an elevated temperature.

PREPARATION 1

This example describes the synthesis of a chain extended and lightly crosslinked polyamidoamine as a precursor to a Type II polymer.

An aqueous solution containing 50.0% by weight of a polyamidoamine (1500 g) was stirred in a round-bottomed flask with epichlorohydrin (13 g) added all at once. The polyamidoamine, designated as Polymer 567, is made from adipic acid and diethylenetriamine and is available from Hercules Incorporated, Wilmington, Del., U.S.A. The temperature was raised to 70° C. until a stable viscosity was reached. The final product has a Brookfield viscosity of 5500 mPa.s using a No. 4 spindle and 60 rpm at 25° C.

PREPARATION 2

This example describes the synthesis of a Type II polymer from Polymer 567, a polyamidoamine available from Hercules Incorporated, Wilmington, Del., U.S.A.

An aqueous solution containing 50.0% by weight of Polymer 567 (500 g) was placed in a round-bottomed flask and heated with stirring to 60° C. A solution of sodium chloroacetate (70.2 g) in water (100 g) was added to the stirred flask contents. The temperature rose to 64° C. over 5 minutes. The temperature was readjusted to 60° C. and maintained for a total of 3 hours. The cooled product had a Brookfield viscosity of 274 mPa.s (No. 1 spindle, 12 rpm at 25° C.), and a chloride ion concentration of 2.96%, indicating a chloroacetate conversion of 92.8%.

PREPARATION 3

This example describes the synthesis of a Type II polymer from Polymer 567, a polyamidoamine available from Hercules Incorporated, Wilmington, Del., U.S.A. A higher reaction temperature is used than in Preparation 2.

The procedure of Preparation 2 was repeated except that the reaction mixture was maintained at 70° C. for a total of 3 hours before cooling. In this case a chloride ion concentration of 3.14% was found, indicating a chloroacetate conversion of 98.6%.

PREPARATION 4

This example describes the synthesis of a chain extended and lightly crosslinked polyamidoamine made in situ from Polymer 567, a polyamidoamine available from Hercules Incorporated, Wilmington, Del., U.S.A.

An aqueous solution containing 50.0% by weight of Polymer 567 (500 g) was placed in a round bottomed flask and heated with stirring to 70° C. Epichlorohydrin (3 g) was added in 3 portions of 1 g each and the reaction mixture was maintained at 70° C. for 1 hour with stirring to give a chain extended and lightly crosslinked polyamidoamine. A solution of sodium chloroacetate (70.2 g) in water (100 g) was then added with stirring and the resulting mixture was maintained at 70° C. for a 2.5 hours. The product on cooling was found to have a Brookfield viscosity of 607 mPa.s (No. 1 spindle and 6 rpm at 25° C.), and a chloride ion concentration of 3.10% indicating a combined organochlorine conversion of 92.5%.

PREPARATION 5

This example describes the synthesis of a Type II polymer from a chain extended and more heavily crosslinked polyamidoamine made in situ from Polymer 567, a polyamidoamine available from Hercules Incorporated, Wilmington, Del., U.S.A.

A 50% by weight aqueous solution of Polymer 567 (500 g) was placed in a round bottomed flask and heated with stirring to 70° C. Epichlorohydrin (3 g) was added all at once and the reaction mixture was maintained at 70° C. until the point at which no further increase in the reaction mixture viscosity occurred. A chain extended and slightly more heavily crosslinked polyamidoamine was produced than was made in Preparation 4. A solution of sodium chloroacetate (70.2 g) in water (100 g) was then added with stirring and the resulting mixture was maintained at 70° C. for 3 hours. The product on cooling was found to have a Brookfield viscosity of 3370 mPa.s (No. 1 spindle and 1.5 rpm at 25° C.), and a chloride ion concentration of 3.11%, indicating a combined organochlorine conversion of 93%.

EXAMPLE 1

A normal papermaking stock was prepared consisting of bleached and beaten birch and pine fibers.

The stock was divided into fractions, the first of which contained no wet strengthening agent. The other fractions, numbered 2–6, contained the wet strengthening agents listed in Table 1. Type I polymer KYMENE® 557H wet strength resin, available from Hercules Incorporated, Wilmington, Del., U.S.A., is an epichlorohydrin-modified polyamidoamine made from adipic acid and diethylenetriamine. CMC 129 is a commercial grade of sodium carboxymethylcellulose available from Aqualon France B.V., Alizay, France.

The untreated stock and treated stock fractions were made into hand sheets using standard laboratory equipment. After drying, the treated and untreated sheets were conditioned for one week at 23° C., and then cut and tested for tensile strength in the dry and wet state after immersing in water for two hours.

The tensile strength results for the treated sheets are expressed in two ways: as a percentage of the result for the control (the handsheets made using the Type 1 resin alone), and each wet tensile result was individually presented as a percentage of the dry tensile result for each specimen. The second method provides some correction for any sample to sample paper variations. The test results are given in Table 1.

TABLE 1

| Sample No. | Wet Strengthening Composition and Dry Basis Addition Levels | Dry Strength (Newtons/ 25 mm sample width) | Wet Strength (As Percent of Control Result) | Wet/Dry Strength (Percent) |
| --- | --- | --- | --- | --- |
| 1 | None | 2.72 | None | 0.0 |
| 2 | 0.5% KYMENE ® 557H (Type I) (Control) | 2.96 | 0.53(100) | 17.9 |
| 3 | 0.5% KYMENE ® 557H (Type I) 0.25% Product of Preparation 2 (Type II) | 3.28 | 0.70(132.1) | 21.3 |
| 4 | 0.5% KYMENE ® 557H (Type I) 0.25% Product of Preparation 4 (Type II) | 3.82 | 0.85(160.4) | 22.3 |
| 5 | 0.5% KYMENE ® 557H (Type I) | 3.57 | 0.81(152.8) | 22.7 |

TABLE 1-continued

| Sample No. | Wet Strengthening Composition and Dry Basis Addition Levels | Dry Strength (Newtons/ 25 mm sample width) | Wet Strength (As Percent of Control Result) | Wet/Dry Strength (Percent) |
|---|---|---|---|---|
| 6 | 0.25% Product of Preparation 5 (Type II) 0.5% KYMENE ® 557H (Type I) 0.25% CMC 129 | 3.88 | 0.79(149.1) | 20.4 |

The results show the significant improvement in dry and wet strength properties using a combination of Type I and Type II polymers compared with the use of a Type I polymer alone.

It is not intended that the examples given here should be construed to limit the invention, but rather they are submitted to illustrate some of the specific embodiments of the invention. Various modifications and variations of the present invention can be made without departing from the scope of the appended claims.

We claim:

1. A composition comprising (1) an aqueous solution of a cationic polymer that cures at a neutral pH and is capable by itself of conferring wet strength to paper, the resin having a multiplicity of 3-hydroxyazetidinium ion groups along the polymer chain, and (2) an aqueous solution of a water-soluble polyamine polymer comprising tertiary amine groups substituted with a carboxyalkyl group, or a carboxylic acid salt thereof, within recurring units along the polymer chain.

2. The composition of claim 1, wherein the tertiary amine groups have the formula:

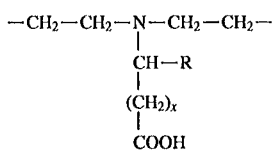

in which R is selected from the group consisting of H, methyl and ethyl and x is 0 or the integer 1, or a carboxylic acid salt thereof.

3. The composition of claim 1, wherein polymer (1) is a polyalkylene polyamine/epihalohydrin resin.

4. The composition of claim 3, wherein the polyalkylene polyamine has the formula $H_2N((CH_2)_mNH)_n(CH_2)_mNH_2$, where n is an integer from 1 to 6 and m is an integer from 2 to 8.

5. The composition of claim 3, wherein the epihalohydrin is epichlorohydrin.

6. The composition of claim 1, wherein polymer (1) is a polyamidoamine/epihalohydrin resin.

7. The composition of claim 6, wherein the epihalohydrin is epichlorohydrin.

8. The composition of claim 6, wherein the polyamidoamine is made from (a) a polyalkylene polyamine having the formula $H_2N((CH_2)_mNH)_n(CH_2)_mNH_2$ where n is an integer from 1 to 6 and m is an integer from 2 to 8, and (b) an aliphatic dicarboxylic acid having the formula $HOOC(CH_2)_yCOOH$, where y is an integer from 3 to 5.

9. The composition of claim 8, wherein the polyamidoamine is made from diethylenetriamine and adipic acid.

10. The composition of claim 1, wherein polymer (2) is made from a polyamine and a compound that introduces a carboxylic acid group at the secondary amine groups of the polyamine.

11. The composition of claim 10, wherein the polyamine is a polyalkylene polyamine.

12. The composition of claim 11, wherein the polyalkylene polyamine has the formula $H_2N((CH_2)_mNH)_n(CH_2)_mNH_2$ where n is an integer from 3 to 6 and m is an integer from 2 to 8.

13. The composition of claim 10, wherein the compound that introduces a carboxylic acid group is an alpha- or beta-haloaliphatic acid having the formula $RCHX—(CH_2)_x—COOH$, or a salt thereof, where R is H, methyl or ethyl; X is Cl, Br, or I, and x is 0 or the integer 1.

14. The composition of claim 13, wherein the compound is sodium chloroacetate.

15. The composition of claim 10, wherein the compound that introduces a carboxylic acid group is an ethylenically unsaturated carboxylic acid.

16. The composition of claim 15, wherein the compound is acrylic acid.

17. The composition of claim 10, wherein the polyamine is a polyamidoamine.

18. The composition of claim 17, wherein the polyamidoamine is made from (a) a polyalkylene polyamine having the formula $H_2N((CH_2)_mNH)_n(CH_2)_mNH_2$ where n is an integer from 1 to 6 and m is an integer from 2 to 8, and (b) an aliphatic dicarboxylic acid having the formula $HOOC(CH_2)_yCOOH$ where y is an integer from 3 to 5.

19. The composition of claim 18, wherein the polyamidoamine is made from diethylenetriamine and adipic acid.

20. The composition of claim 17, wherein the polyamidoamine is modified by reaction with less than a stoichiometric amount of an epihalohydrin, based on the content of secondary amine groups in the polyamidoamine.

21. The composition of claim 20, wherein the epihalohydrin is epichlorohydrin.

22. The composition of claim 20, wherein the amount of epihalohydrin used, based on the content of secondary amine groups present in the polyamidoamine, is in the range of about 0.02:1 to about 0.25:1.

23. The composition of claim 1, wherein the viscosity of polymer (2) is 1000 mPa.s or less at a polymer solids concentration at least about 10% by weight.

24. The composition of claim 1, wherein polymer (1) is an epichlorohydrin-modified polyamidoamine made from diethylenetriamine and adipic acid and polymer (2) is polyamidoamine made from diethylenetriamine and adipic acid that has been reacted with a compound that introduces a carboxylic acid group at the secondary amine groups of the polyamine.

25. The composition of claim 24, wherein the polyamidoamine used to make polymer (2) is modified by reaction with less than a stoichiometric amount of epichlorohydrin, based on the content of secondary amine groups in the polyamidoamine.

26. The composition of claim 22, wherein the viscosity of polymer (2) is 1000 mPa.s or less at a polymer solids concentration of at least about 10% by weight at 25° C.

27. A process for making wet strengthened paper comprising (a) treating an aqueous suspension of papermaking fibers with the composition of claim 1.

28. The process of claim 27, wherein the tertiary amine groups have the formula:

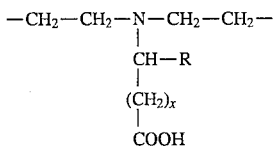

in which R is selected from the group consisting of H, methyl and ethyl and x is 0 or the integer 1, or a carboxylic acid salt thereof.

29. The process of claim 27, wherein polymer (1) is a polyalkylene polyamine/epihalohydrin resin.

30. The process of claim 29, wherein the polyalkylene polyamine has the formula

where n is an integer from 1 to 6 and m is an integer from 2 to 8.

31. The process of claim 30, wherein the epihalohydrin is epichlorohydrin.

32. The process of claim 27, wherein polymer (1) is a polyamidoamine/epihalohydrin resin.

33. The process of claim 32, wherein the epihalohydrin is epichlorohydrin.

34. The process of claim 32, wherein the polyamidoamine is made from (a) a polyalkylene polyamine having the formula $H_2N((CH_2)_mNH)_n(CH_2)_mNH_2$ where n is an integer from 1 to 6 and m is an integer from 2 to 8, and (b) an aliphatic dicarboxylic acid having the formula $HOOC(CH_2)_yCOOH$, where y is an integer from 3 to 5.

35. The process of claim 34, wherein the polyamidoamine is made from diethylenetriamine and adipic acid.

36. The process of claim 27, wherein polymer (2) is made from a polyamine and a compound that introduces a carboxylic acid group at the secondary amine groups of the polyamine.

37. The process of claim 36, wherein the polyamine is a polyalkylene polyamine.

38. The process of claim 37, wherein the polyalkylene polyamine has the formula $H_2N((CH_2)_mNH)_n(CH_2)_mNH_2$ where n is an integer from 3 to 6 and m is an integer from 2 to 8.

39. The process of claim 36, wherein the compound that introduces a carboxylic acid group is an alpha- or beta-haloaliphatic acid having the formula $RCHX-(CH_2)_x-COOH$, or a salt thereof, where R is H, methyl or ethyl; X is Cl, Br, or I, and x is 0 or the integer 1.

40. The process of claim 39, wherein the compound is sodium chloroacetate.

41. The process of claim 36, wherein the compound that introduces a carboxylic acid group is an ethylenically unsaturated carboxylic acid.

42. The process of claim 41, wherein the compound is acrylic acid.

43. The process of claim 36, wherein the polyamine is a polyamidoamine.

44. The process of claim 43, wherein the polyamidoamine is made from (a) a polyalkylene polyamine having the formula $H_2N((CH_2)_mNH)_n(CH_2)_mNH_2$ where n is an integer from 1 to 6 and m is an integer from 2 to 8, and (b) an aliphatic dicarboxylic acid having the formula $HOOC(CH_2)_yCOOH$ where y is an integer from 3 to 5.

45. The process of claim 44, wherein the polyamidoamine is made from diethylenetriamine and adipic acid.

46. The process of claim 43, wherein the polyamidoamine is modified by reaction with less than a stoichiometric amount of an epihalohydrin, based on the content of secondary amine groups in the polyamidoamine.

47. The process of claim 46, wherein the epihalohydrin is epichlorohydrin.

48. The process of claim 46, wherein the amount of epihalohydrin used, based on the content of secondary amine groups present in the polyamidoamine, is in the range of about 0.02:1 to about 0.25:1.

49. The process of claim 27, wherein the viscosity of polymer (2) is 1000 mPa.s or less at a polymer solids concentration of at least about 10% by weight at 25° C.

50. The process of claim 27, wherein polymer (1) is an epichlorohydrin-modified polyamidoamine made from diethylenetriamine and adipic acid, and polymer (2) is polyamidoamine made from diethylenetriamine and adipic acid that has been reacted with a compound that introduces a carboxylic acid group at the secondary amine groups of the polyamine.

51. The process of claim 50, wherein the polyamidoamine used to make polymer (2) is modified by reaction with less than a stoichiometric amount of epichlorohydrin, based on the content of secondary amine groups in the polyamidoamine.

52. The process of claim 51, wherein the viscosity of polymer (2) is 1000 mPa.s or less at a polymer solids concentration of at least about 10% by weight at 25° C.

53. The process of claim 27, wherein the amount of the composition added to the papermaking fibers is about is 0.1 to about 4% by weight of the combination of polymers (1) and (2), based on the dry weight of the fibers.

54. The process of claim 27, wherein the dry mass ratios of polymer (1) to polymer (2) is between about 1:0.1 and about 1:2.

* * * * *